US012638915B2

(12) United States Patent
Braley et al.

(10) Patent No.: US 12,638,915 B2
(45) Date of Patent: May 26, 2026

(54) SYSTEMS, APPARATUSES, METHODS, AND NON-TRANSITORY COMPUTER-READABLE STORAGE DEVICES FOR MANAGING NOTIFICATIONS ON ELECTRONIC DEVICES

(71) Applicant: HUAWEI TECHNOLOGIES CO., LTD., Shenzhen (CN)

(72) Inventors: Sean Braley, Orillia (CA); Roeland Petrus Hubertus Vertegaal, Perth Road (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/382,126

(22) Filed: Oct. 20, 2023

(65) Prior Publication Data

US 2025/0130632 A1 Apr. 24, 2025

(51) Int. Cl.
*G06F 3/01* (2006.01)
*G06F 3/16* (2006.01)
*G06T 19/00* (2011.01)
(52) U.S. Cl.
CPC .............. *G06F 3/013* (2013.01); *G06F 3/167* (2013.01); *G06T 19/00* (2013.01)
(58) Field of Classification Search
None
See application file for complete search history.

(56) References Cited

U.S. PATENT DOCUMENTS

| 5,850,211 A | 12/1998 | Tognazzini |
| 7,762,665 B2 | 7/2010 | Vertegaal et al. |
| 10,373,617 B2 | 8/2019 | Piernot et al. |

(Continued)

FOREIGN PATENT DOCUMENTS

| EP | 2600220 B2 | 6/2013 | |
| KR | 20150093016 A | * 8/2015 | ............... G06F 3/14 |

OTHER PUBLICATIONS

Vertegaal, R. (2003). Attentive user interfaces: Introduction. Communications of the ACM, 46, 30-33.

(Continued)

*Primary Examiner* — Benjamin C Lee
*Assistant Examiner* — Emily J Frank
(74) *Attorney, Agent, or Firm* — Tim Tingkang Xia, Esq.; Troutman Pepper Locke LLP

(57) ABSTRACT

Methods and systems for intelligent notification management using gaze tracking are disclosed. The method comprises receiving a user's point of gaze (POG) from a gaze tracking device that monitors the user's eye movement and direction. It also obtains the spatial position of a notification displayed on an electronic device within a particular space. If the user's POG remains within a boundary defined by the spatial position of the notification for a predetermined period of time, a signal is sent to the electronic device indicating that the user has viewed the notification. The notification is then labeled as having been viewed. The various embodiments described herein enhance user-device interaction, ensure efficient delivery of notifications, and facilitate a streamlined user experience by ensuring that users do not miss important notifications and by enabling seamless interaction across devices.

26 Claims, 7 Drawing Sheets

(56)       References Cited

U.S. PATENT DOCUMENTS

| | | | |
|---|---|---|---|
| 11,907,421 B1* | 2/2024 | Clements ................ | G06F 3/012 |
| 2012/0295708 A1* | 11/2012 | Hernandez-Abrego ..................... | |
| | | | B60K 35/10 |
| | | | 463/36 |
| 2015/0227195 A1* | 8/2015 | McKenna ............... | G06F 3/013 |
| | | | 345/156 |
| 2021/0004081 A1* | 1/2021 | Sugihara ................. | G06F 3/013 |
| 2023/0098174 A1* | 3/2023 | Simes ..................... | G10L 15/22 |
| | | | 704/275 |
| 2023/0237752 A1* | 7/2023 | Elhadad ................ | G06F 1/1686 |
| | | | 345/419 |
| 2024/0129437 A1* | 4/2024 | Zhang .................... | G06T 13/00 |

OTHER PUBLICATIONS

A. M. Penkar, C. Lutteroth, and G. Weber. (2012). Designing for the eye: design parameters for dwell in gaze interaction. In Proceedings of the 24th Australian Computer-Human Interaction Conference (OzCHI '12). Association for Computing Machinery, New York, NY, USA, 479-488.

R. J. K. Jacob. (1991). The Use of Eye Movements in Human-Computer Interaction Techniques: What You Look at is What You Get. In ACM Trans. Inf. Syst. 9, 2, 152-169.

* cited by examiner

External Notification — 101

102

Harmony OS Ecosystem

Internal Notification — 103

104

Harmony OS Device 1

105

Harmony OS Device 2

108

Display

Harmony OS Device *n*

Harmony OS Gaze Tracking — 106

External Gaze Tracking — 107

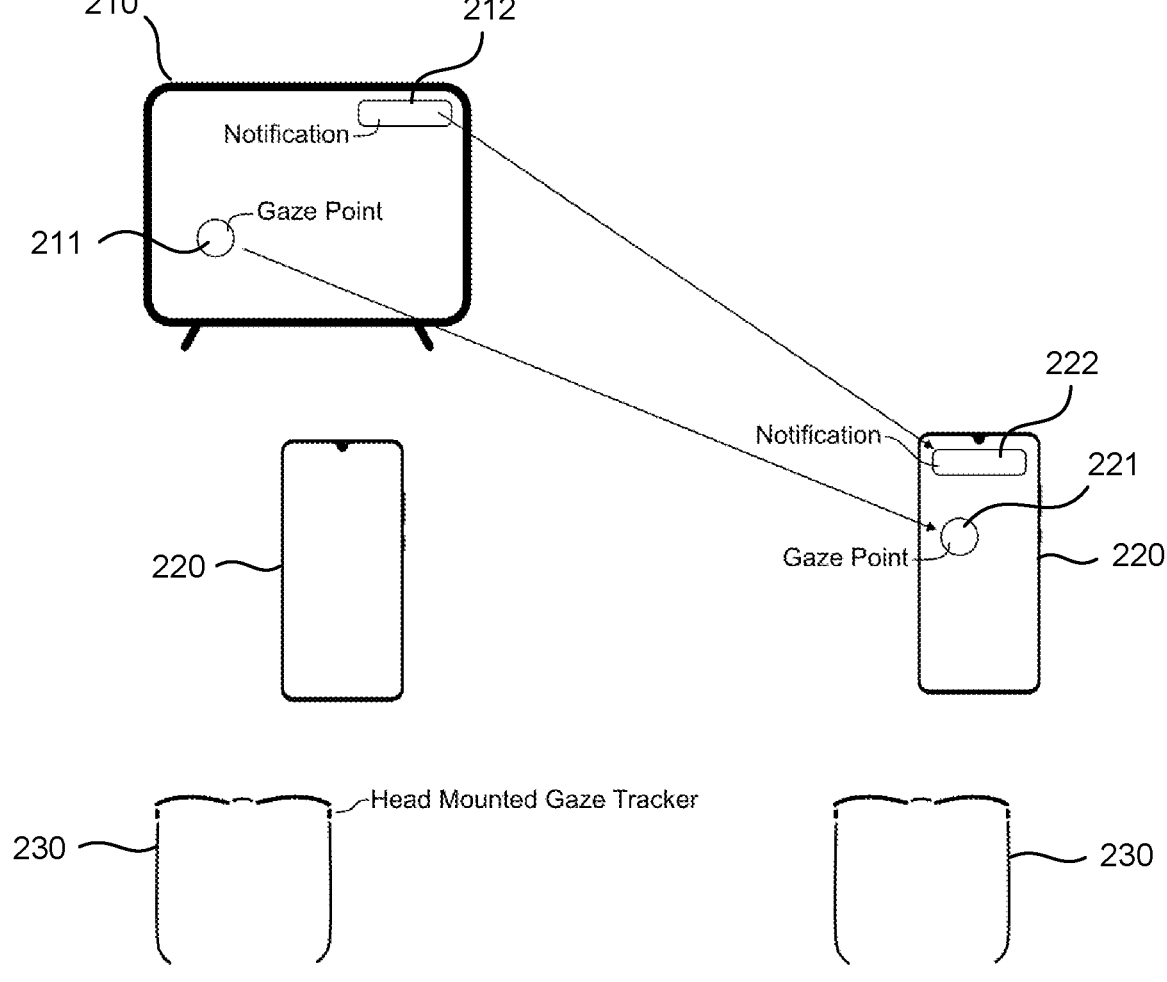
FIG. 2A     FIG. 2B

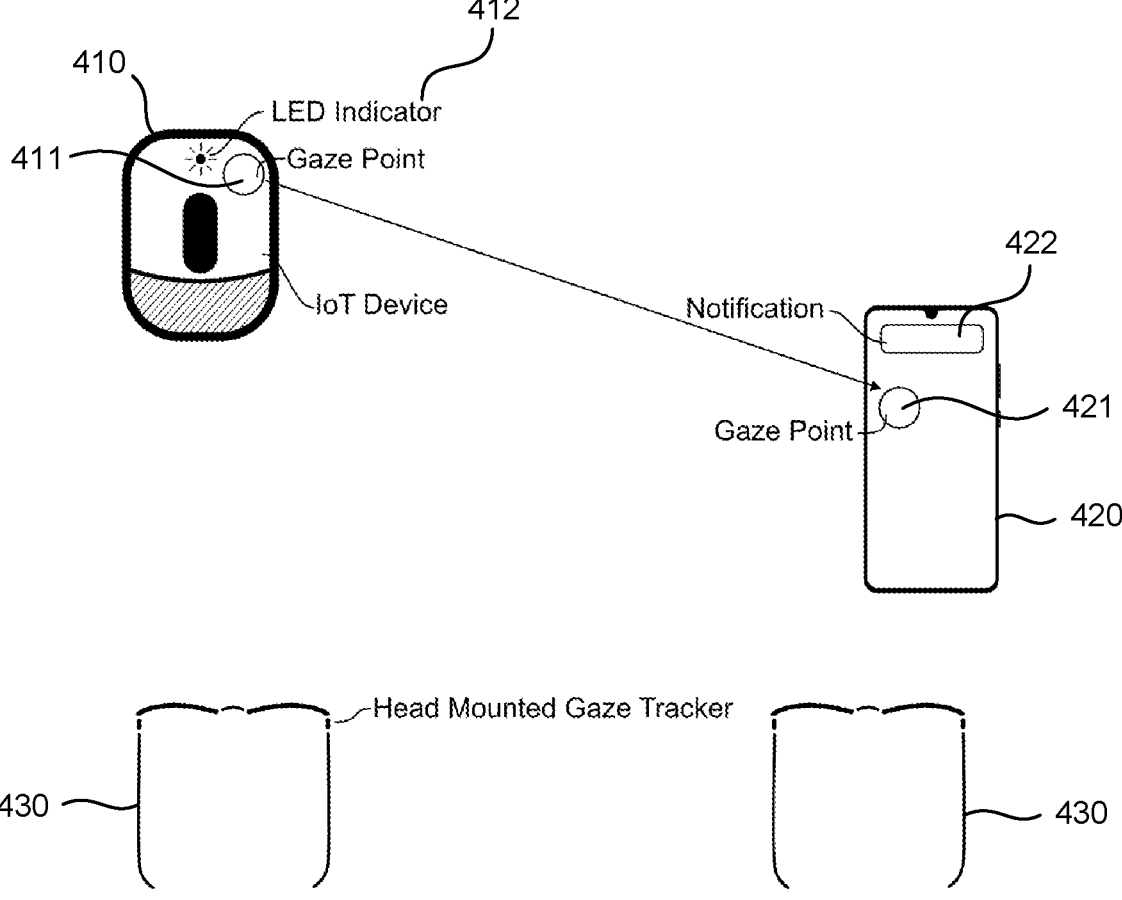
FIG. 4A                                        FIG. 4B

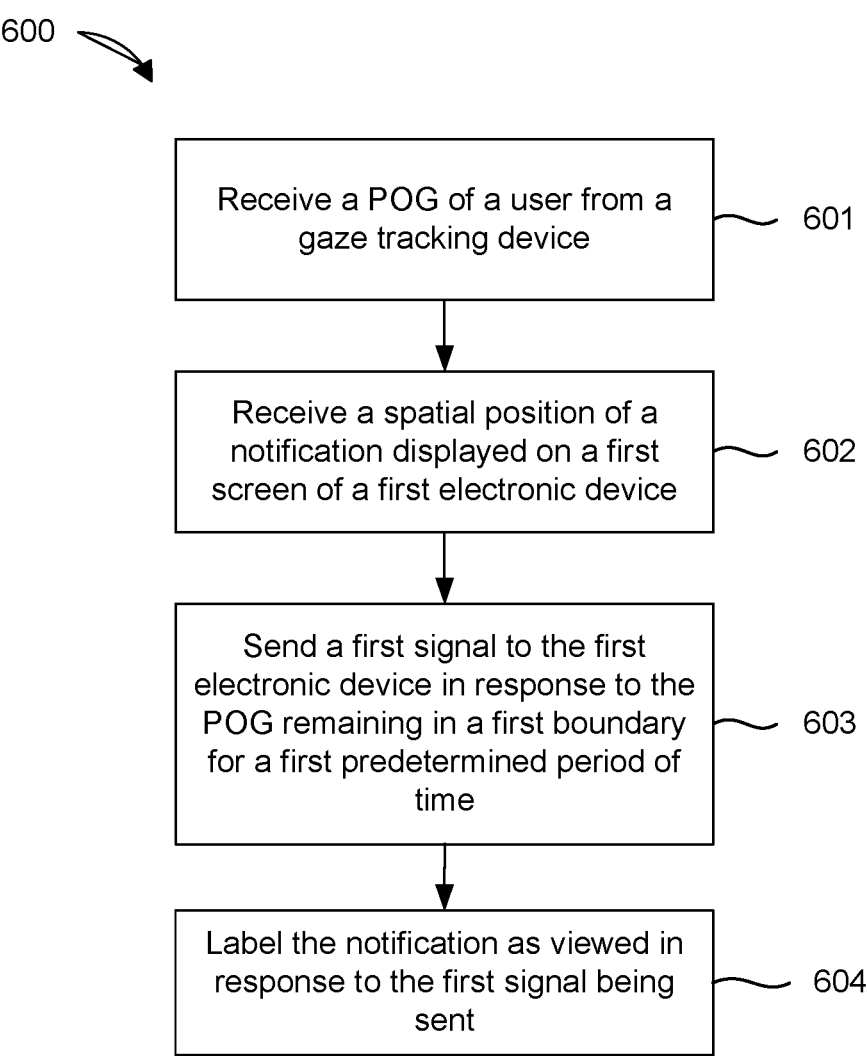

600

Receive a POG of a user from a gaze tracking device — 601

Receive a spatial position of a notification displayed on a first screen of a first electronic device — 602

Send a first signal to the first electronic device in response to the POG remaining in a first boundary for a first predetermined period of time — 603

Label the notification as viewed in response to the first signal being sent — 604

701 — Receive a POG of a user from a gaze tracking unit of a headset

702 — Receive a virtual position of a notification displayed in a virtual space

703 — Send a first signal to the graphics unit in response to the POG remaining in a first boundary for a first predetermined period of time 704 — Label the notification as viewed in response to the first signal being sent

SYSTEMS, APPARATUSES, METHODS, AND NON-TRANSITORY COMPUTER-READABLE STORAGE DEVICES FOR MANAGING NOTIFICATIONS ON ELECTRONIC DEVICES

FIELD OF THE DISCLOSURE

The present disclosure relates generally to systems, apparatuses, methods, and non-transitory computer-readable storage medium, and in particular to systems, apparatuses, methods, and non-transitory computer-readable storage medium for managing notifications on electronic devices based on gaze tracking.

BACKGROUND

In the early days of electronic devices, the primary method of user notification was simple, often using simple audio or visual cues to get the user's attention. Over time, as devices became more sophisticated and began to support different applications, notifications became more complex and varied. Initially, these notifications appeared primarily on desktop computers and later on mobile devices in the form of emails, system updates, application alerts, and more. With the advent of the Internet of Things (IoT), notifications are now ubiquitous, appearing on a variety of devices ranging from smart watches to smart home systems.

While notifications play an important role in alerting users to important updates and messages, they can also present challenges. One key challenge is the repetitive nature of notifications across multiple devices. In today's interconnected digital landscape, a single notification can appear almost simultaneously on a user's phone, computer, smartwatch, and other connected devices. This can lead to distraction and even frustration, especially if the user has to manually dismiss or disable the same notification on multiple devices. In the worst case, this can lead to "notification fatigue," where the user becomes so overwhelmed by the constant influx of notifications that they begin to ignore them altogether, potentially missing out on important information. This highlights the need for smarter, more user-friendly notification management systems.

SUMMARY

According to one aspect of this disclosure, there is provided a method of notification management. The method comprises: receiving a point of gaze (POG) of a user from a gaze tracking device, the POG representing a direction of an eye of the user; receiving a spatial position of a notification displayed on a first screen of a first electronic device in a space; sending a first signal to the first electronic device in response to the POG of the user remaining within a first boundary around the spatial position of the notification for a first predetermined period of time, wherein the first signal is used to label the notification as viewed.

In an embodiment, the method may further comprises sending a second signal to the first electronic device in response to the POG of the user remaining on the first screen for a second predetermined period of time and the notification not being labeled as viewed, the second signal indicating that the user is looking at the first screen, wherein the first electronic device may display the notification on the first screen in response to the first electronic device receiving the second signal.

In an embodiment, the notification may be removed from the first screen in response to the first electronic device receiving the first signal.

In an embodiment, the method may further comprise sending a third signal to a second electronic device having a second screen in response to the POG of the user remaining on the second screen for the second predetermined period of time and the notification not being labeled as viewed, the third signal indicating that the user is looking at the second screen, wherein the second electronic device may display the notification on the second screen in response to the second electronic device receiving the third signal.

In an embodiment, the method may further comprise sending the first signal to the first electronic device and the second electronic device in response to the POG of the user remaining within a second boundary defined by the spatial position of the notification displayed on the second screen for the first predetermined period of time.

In an embodiment, the notification may be removed from the second screen in response to the second electronic device receiving the first signal.

In an embodiment, the method may further comprise: sending a fourth signal to a third electronic device in response to the POG of the user remaining on the third electronic device for the second predetermined period of time and the notification not being labeled as viewed, the fourth signal indicating that the user is looking at the third electronic device, wherein the third electronic device notifies the user of the notification by a visual or audible alert in response to the third electronic device receiving the fourth signal.

In an embodiment, the method may further comprise sending the first signal to the first electronic device and the third electronic device in response to the user giving a vocal command that the user has viewed the notification.

In an embodiment, the gaze tracking device may be wearable by the user, and wherein the gaze tracking device may comprise a front viewing camera for capturing a field of view of the user, the spatial position of the notification in the space being obtained from the captured field of view.

According to another aspect of this disclosure, there is provided a method of notification management. The method comprises: receiving a point of gaze (POG) of a user from a gaze tracking unit of a headset, the POG representing a direction of an eye of the user; receiving a virtual position of a notification displayed in a virtual space, wherein the headset comprises a graphics unit for rendering three-dimensional (3D) representation of the virtual space that is viewable by the user wearing the headset; sending a first signal to the graphics unit in response to the POG of the user remaining within a first boundary around the virtual position of the notification for a first predetermined period of time, wherein the first signal is used to label the notification as viewed.

In an embodiment, the method may further comprise: sending a second signal to the graphics unit in response to the POG of the user remaining on a second boundary encompassing the first boundary for a second predetermined period of time and the notification not being labeled as viewed, wherein the graphics unit may render the notification at the virtual position in response to the graphics unit receiving the second signal.

In an embodiment, the method may further comprise: sending a second signal to the graphics unit in response to the POG of the user remaining on a second boundary encompassing the first boundary for a second predetermined period of time and the notification not being labeled as viewed, wherein the graphics unit may render a visual alert in the virtual space or an audio unit of the headset plays an audible alert to notify the user of the notification in response to the graphics unit receiving the second signal.

In an embodiment, the method may further comprise: sending the first signal to the graphics unit and the audio unit in response to a microphone unit of the headset receiving a vocal command from the user.

In an embodiment, the notification may be removed from the virtual position in the virtual space in response to the graphics unit receiving the first signal.

According to yet another aspect of this disclosure, there is provided a device for notification management. The device comprises: one or more circuits for: receiving a point of gaze (POG) of a user from a gaze tracking device, the POG representing a direction of an eye of the user; and receiving a spatial position related to a notification displayed on a first screen of a first electronic device in a space; determining if the POG of the user remains within a first boundary around the spatial position of the notification for a first predetermined period of time; sending a first signal to the first electronic device in response to the determination being positive, wherein the first signal is used to label the notification as viewed.

In an embodiment, the processing unit may send a second signal to the first electronic device in response to the POG of the user remaining on the first screen for a second predetermined period of time and the notification not being labeled as viewed by the notification management unit, the second signal indicating that the user is looking at the first screen; and wherein the notification may be displayed on the first screen in response to the second signal being received by the first electronic device.

In an embodiment, the notification may be removed from the first screen in response to the first signal being received by the first electronic device.

In an embodiment, the device may send a third signal to a second electronic device in response to the POG of the user remaining on the second screen for the second predetermined period of time and the notification not being labeled as viewed by the notification management unit, the third signal indicating that the user is looking at a second screen of the second electronic device; and wherein the notification may be displayed on the second screen in response to the third signal being received by the second electronic device.

In an embodiment, the device may send the first signal to the first electronic device and the second electronic device in response to the POG of the user remaining within a second boundary defined by the spatial position of the notification displayed on the second screen for the first predetermined period of time.

In an embodiment, the notification may be removed from the second screen in response to the first signal being received by the second electronic device.

In an embodiment, the device may send a fourth signal to the third electronic device in response to the POG of the user remaining on a third electronic device for the second predetermined period of time and the notification not being labeled as viewed by the notification management unit, the fourth signal indicating that the user is looking at the third electronic device, and wherein the notification may be communicated to the user by a visual or audible alert in response to the fourth signal being received by the third electronic device.

In an embodiment, the device may send the first signal to the first electronic device and the third electronic device in response to the user giving a vocal command that the user has viewed the notification.

In an embodiment, a field of view of the user may be captured by a front viewing camera of the gaze tracking device worn by the user, the spatial position of the notification in the space being obtained from the captured field of view.

According to a further aspect of this disclosure, there is provided a headset. The headset comprises: a graphics unit for rendering three-dimensional (3D) representation of a virtual space that is viewable by a user wearing the headset; a gaze tracking unit, the gaze tracking unit being capable of determining a point of gaze (POG) of a user, and the POG representing a direction of an eye of the user; and a coordinating unit for receiving the POG of the user determined by the gaze tracking unit and for receiving a virtual position of a notification in the virtual space, wherein the coordinating unit sends a first signal to the graphics unit in response to the POG of the user remaining within a first boundary around the virtual position of the notification for a first predetermined period of time, and wherein the first signal is used to label the notification as viewed.

In an embodiment, the coordinating unit may send a second signal to the graphics unit in response to the POG of the user remaining on a second boundary encompassing the first boundary for a second predetermined period of time and the notification not being labeled as viewed, and wherein the graphics unit may render the notification at the virtual position in response to the graphics unit receiving the second signal.

In an embodiment, the headset may further comprise an audio unit, wherein the coordinating unit may send a second signal to the graphics unit in response to the POG of the user remaining on a second boundary encompassing the first boundary for a second predetermined period of time and the notification not being labeled as viewed, and wherein the graphics unit may render a visual alert in the virtual space or the audio unit plays an audible alert to notify the user of the notification in response to the graphics unit receiving the second signal.

In an embodiment, the headset may further comprise a microphone unit, wherein the coordinating unit sends the first signal to the graphics unit and the audio unit in response to the microphone unit receiving a vocal command from the user.

In an embodiment, the notification may be removed from the virtual position in the virtual space in response to the graphics unit receiving the first signal.

According to a different aspect of this disclosure, there is provided a non-transitory computer-readable storage medium storing instructions, which when executed by a processor of an electronic device, causes the electronic device to perform the methods described herein.

By using the apparatus, method, and system disclosed herein, the incorporation of gaze tracking into notification management offers a number of technical advantages that improve the user experience. One of the benefits is the ability to provide a faster and more efficient user experience. By determining which device the user is currently looking at, notifications may be intelligently managed to appear only on that device. This not only optimizes user attention, but also helps save energy by reducing unnecessary display activity on unattended devices. In addition, this approach may increase the likelihood that users will not miss critical notifications amidst a barrage of alerts on multiple devices.

Gaze tracking also introduces a lightweight mechanism to dismiss notifications simply by looking at them, reducing the need for physical interaction and simplifying the overall user experience. Finally, the integration of gaze tracking according to the embodiments described herein promotes seamless interaction between devices, further enhancing the ease and efficiency of managing notifications in a complex environment. By providing a more focused and intuitive approach to notification management, the embodiments disclosed herein effectively address the challenges associated with the ubiquity of notifications in today's digital landscape.

BRIEF DESCRIPTION OF THE DRAWINGS

FIGS. 2A and 2B are schematic diagrams showing a scenario in which a user wears a gaze tracking headset to track the user's gaze, according to some embodiments of this disclosure;

FIGS. 4A and 4B are schematic diagrams showing a further scenario in which a user wears a gaze tracking headset to track the user's gaze, according to some embodiments of this disclosure;

FIG. 6 is a flowchart directed to a method for managing notifications based on gaze tracking in a real space, according to some embodiments of this disclosure.

DETAILED DESCRIPTION

Figure 1:
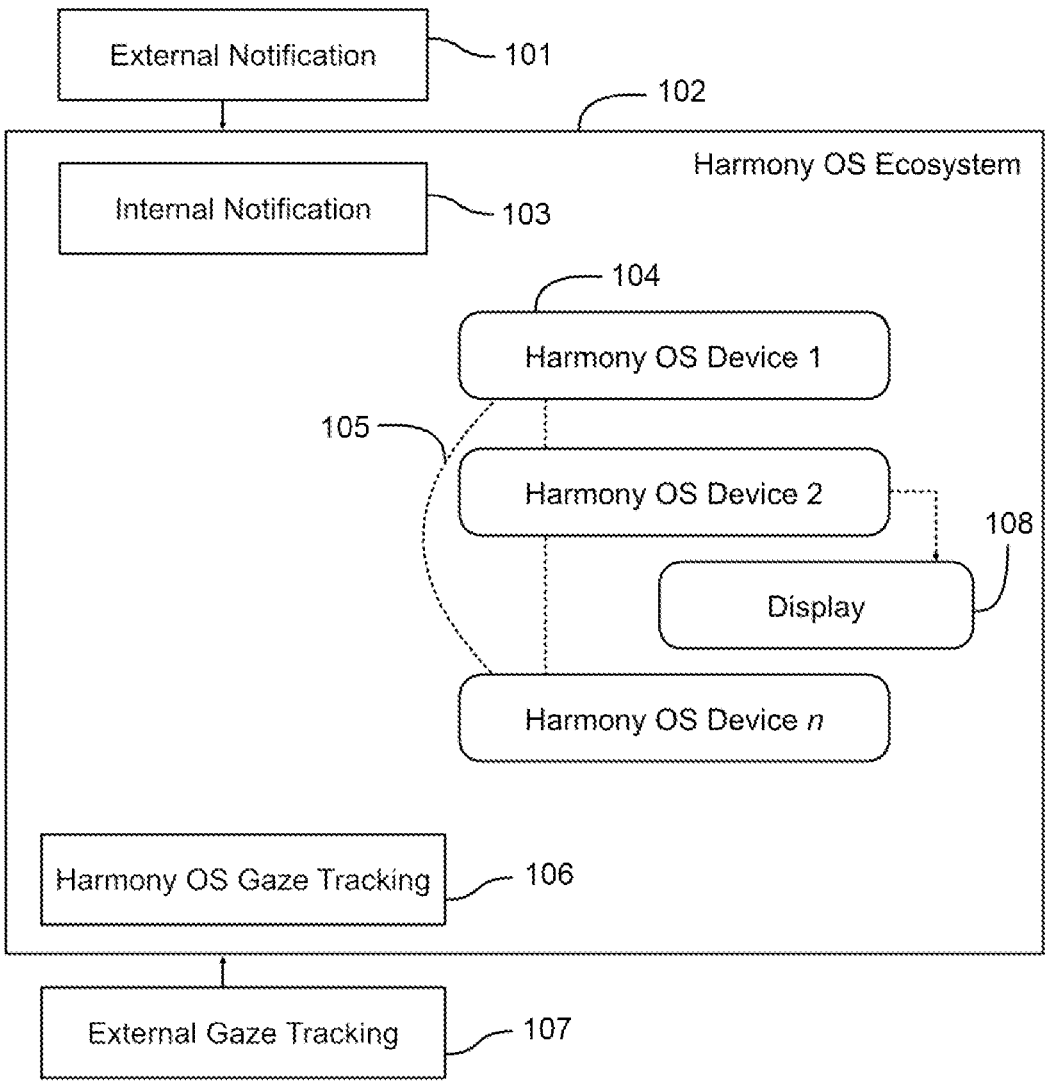
FIG. 1 is a simplified schematic diagram of a system for enabling notification management based on gaze tracking, according to some embodiments of this disclosure.

The advent of electronic devices has revolutionized digital communication, and the notification system has emerged as a useful tool. Ranging from simple audio-visual cues to complex application-specific alerts, notifications keep users informed of updates, news, and other pertinent information. In recent years, notifications have spread across a variety of devices, including desktop computers, smartphones, smartwatches, and Internet of Things (IoT) devices, making them a ubiquitous facet of our digital lives.

However, users, who are often surrounded by one or more electronic devices at a time, face challenges in managing these notifications. A single alert may appear simultaneously on multiple devices, leading to redundancy, potential distraction, and the tedious task of manual dismissal. This ubiquity, while informative, may lead to "notification fatigue," where users overwhelmed by the constant influx of alerts begin to ignore them. In severe cases, critical notifications may be missed, highlighting a significant challenge in the existing notification management system.

The present disclosure is directed to integrating gaze tracking to better manage the notifications in or among the one or more electronic devices. Gaze detection or tracking accurately determines a user's point of gaze (POG), providing insight into the user's attention and behavior. By identifying not only what device a user is looking at, but also what specific position on the device the user is looking at, gaze tracking plays a useful role in intelligently and efficiently managing notifications in various embodiments, as described below.

Gaze estimation, also commonly referred to as gaze tracking, refers to a computer vision task that discerns the direction of a person's gaze, effectively determining what or where the individual is looking. The use of gaze tracking often relies on a mechanism known as "dwell time". Dwell time refers to the amount of time a user needs to look at a particular target before an action is triggered. State-of-the-art gaze estimation technology now has achieved a high degree of accuracy, down to about one degree. Because an individual's eye movement is closely linked to their attention, behavior, and cognition, the potential applications of gaze estimation are extensive and far-reaching. For the purposes of this description, the primary focus will be on applications related to electronic devices.

Devices designed to track a user's point of view are known as gaze tracking devices or simply gaze trackers. There are several types of gaze trackers, including head-mounted versions that track a user's point of gaze relative to an externally facing camera attached to the device, and screen- or device-mounted trackers that measure gaze relative to a fixed device. For example, recent technological advances have seen gaze trackers integrated into virtual reality and augmented reality (VR/AR) headsets, providing a gaze vector relative to a digital scene. On the other hand, gaze trackers may also be integrated into a normal pair of glasses or goggles that allow the user to see the real environment. On the other hand, gaze trackers may also be stationary devices, for example, placed on a desk or attached to a remote screen. These stationary gaze trackers may use sophisticated techniques to track the direction of a user's gaze in relation to the screen or environment. For example, by incorporating infrared sensors and high-resolution cameras, these devices may accurately detect eye movements and positions in real time. The captured data is then processed using algorithms to extrapolate the user's point of view on the distant screen. It should be understood that the present disclosure is not intended to limit the types of gaze trackers, and any type of gaze tracker may be used as long as it meets the desired accuracy and responsiveness requirements.

Turning now to FIG. 1, which depicts a system architecture in which one or more electronic devices 104 are included in a unified ecosystem 102 for enabling notification management based on gaze tracking. The unified ecosystem 102 facilitates inter-device communication 105 that transmits notification-related information and gaze-related information so that the notifications may be managed in an improved manner based on the gaze-related information.

The ecosystem 102, as illustrated in FIG. 1, represents a unified digital network that may seamlessly connect multiple electronic devices 104. This may manifest itself in a variety of forms, from a localized personal network to a larger, more extensive system. In a localized context, the ecosystem 102 may comprise a user's ensemble of digital devices. The electronic devices 104 may include, but is not limited to, smartphones, desktop computers with attached monitors, laptop computers, tablets, e-readers or e-ink display devices, smartwatches, smart televisions, smart speakers, gaming devices, and other Internet of Things (IoT) devices. For instance, a unique ecosystem might be established by integrating diverse devices within a unified network setting. This could encompass Huawei™ devices like the Mate™ smartphones, P series, Nova models, Y series phones, Huawei MatePad™ tablets, Mate View monitors, MateBook™ laptops, MateStation™ desktops, Vision TVs, and the Huawei Sound™ series smart speakers. It should be understood that devices from various brands may also constitute an ecosystem, and the present disclosure does not restrict the ecosystem to specific device types, brands, or performance levels. On a larger scale, the ecosystem 102 may extend to an organizational network encapsulating the digital devices of multiple users, departments, or potentially entire buildings.

In this embodiment, the primary function of the ecosystem 102, regardless of its form or size, is to facilitate efficient inter-device communication 105 that allows the exchange of various types of information, such as notification content, notification delivery status, gaze tracking data, and power status data. The ecosystem 102 also demonstrates versatility by enabling compatibility with a wide range of operating systems. For example, a HarmonyOS™ device may be connected to a non-HarmonyOS™ display 108. In such a configuration, the display 108, which serves as the visual focus for the user, may be recognized as part of the ecosystem 102. Thus, it may act as a direct proxy for the connected HarmonyOS™ device 2, as shown in FIG. 1, mirroring its display and interactive capabilities.

The introduced notifications may originate from various sources, such as an internal notification 103 and an external notification 101. The internal notification 103 may include system-specific alerts, such as a calendar reminder. The external notification 101, on the other hand, may be triggered by external stimuli, such as an incoming text message or a social media alert.

With respect to gaze information, the system may be capable of receiving data from different types of gaze tracking devices. For example, it may receive gaze data from a dedicated gaze tracking device 106 located within the ecosystem 102 or from an external gaze tracking device 107 located outside of, but connected to, the ecosystem 102. In addition, each of the devices 104 within the ecosystem 102 may be individually equipped with gaze tracking capabilities. The gaze data collected from these sources may then be communicated throughout the ecosystem 102 via the inter-device communication 105, thereby enabling a comprehensive, real-time understanding of the user's visual focus across multiple devices. The inclusion of gaze tracking capabilities, either through dedicated gaze tracking devices or through the built-in functionality of individual devices, paves the way for a more intuitive and interactive user experience across the entirety of the connected devices.

Although FIG. 1 illustrates that there are multiple electronic devices 104 in the ecosystem 102, the notification management may be implemented with as few as one electronic device 104, as long as the user's gaze may be tracked to determine whether the notification has been viewed. This process is described below.

As shown in FIGS. 2A and 2B, a scenario is illustrated in which a user wears a gaze tracking headset 230 for tracking the user's gaze. The headset is equipped with technology to identify and track the direction of the user's gaze in real time, thereby providing a dynamic visual record of the user's attention. In addition, the headset is equipped with a front-facing camera (not shown) that captures the exact field of view the user is viewing through the gaze tracking headset 230. This allows the system to determine exactly where on a screen/display the user's gaze is focused, with a tolerance of about 1 degree.

In FIG. 2A, the user is looking at the screen of a first device 210 while not looking at the screen of a second device 220. Since the gaze tracking headset 230 monitors the user's gaze, a first gaze point 211 is determined to be on the screen of the first device 210. As a result, a first notification 212 is displayed on the screen of the first device 210. It should be noted that in different scenarios, the first notification 212 may have been present on the first device 210 prior to the user's gaze being determined to be on that device. However, in this particular instance, the user has dismissed or chosen not to pay attention to the first notification 212.

Instead, as shown in FIG. 2B, the user's gaze shifts to the second device 220. The gaze tracking headset 230 is capable of monitoring this change in attention and registering the user's gaze shift to the screen of the second device 220, indicated by a second gaze point 221. This capability allows the system to understand that the user has not viewed/attended to the first notification 212 on the first device 210. After the user's gaze has been on the second device 220 or the screen of the second device 220 for a predetermined period of time (dwell time), such as a value between 0 millisecond (instant) and 100 milliseconds, a coordinating device of the system determines that the user has attended to the second device 220 and any unviewed notifications may be displayed on the second device 220. Therefore, in response to the user's eye movement, the same notification is displayed as a second notification 222 on the screen of the second device 220. In this example, any of the first device 210, the second device 220, or the gaze tracking headset 230 may be the coordinating device. It should be appreciated that the user may be able to configure the "responsiveness" of the system by adjusting the lower and upper limits of the dwell time.

This scenario shown in FIGS. 2A and 2B provides benefits by facilitating a more efficient and intuitive user experience in a multi-device ecosystem. The gaze tracking headset 230 provides accurate, real-time tracking of the user's gaze, enabling the system to determine the user's point of attention across multiple devices. This allows notifications to be dynamically transmitted across devices based on the user's current focus. If a notification is not viewed on the first device 210, it is dynamically displayed on the second device 220 when the user's attention shifts there. This ensures that notifications are always in the user's immediate field of view, improving visibility and increasing the likelihood of prompt action. This intelligent, gaze-guided notification management eliminates the need for manual checking across devices, providing a seamless, enhanced interaction experience within the multi-device ecosystem.

Figures 3A, 3B:
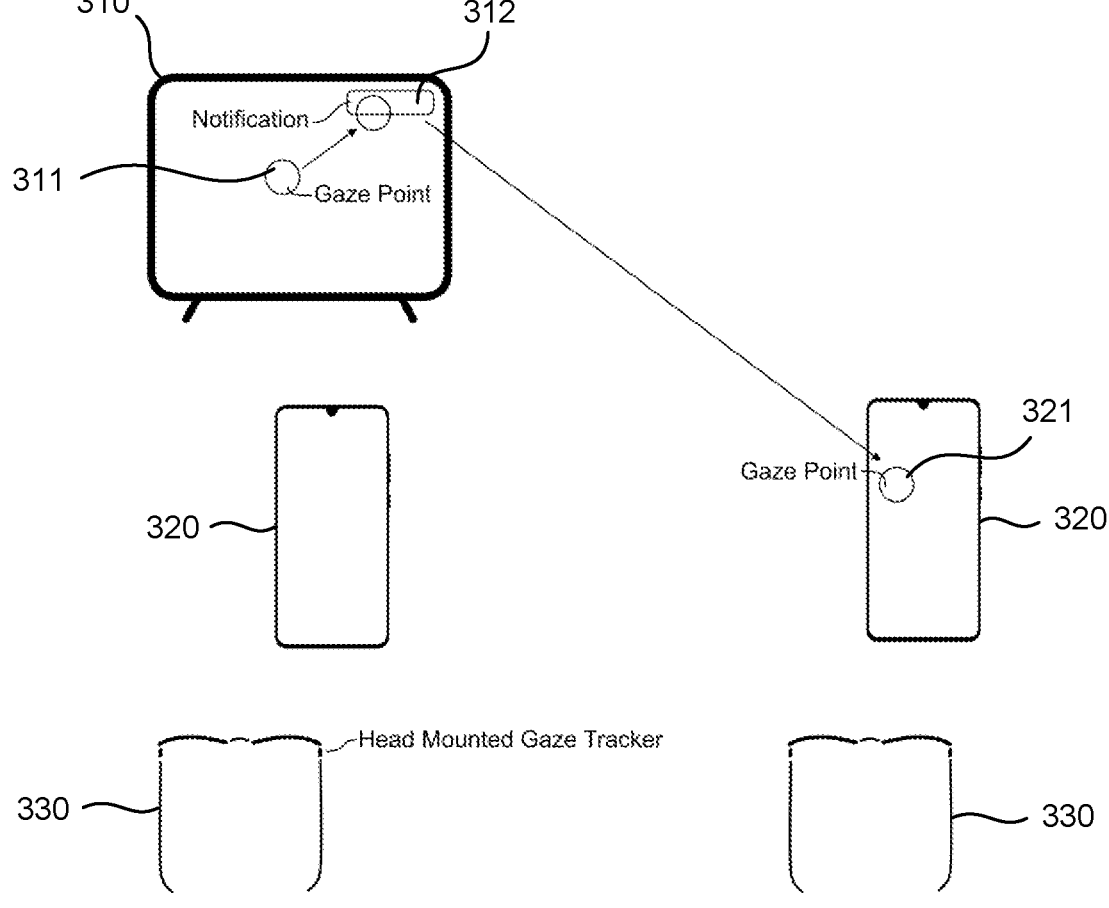
FIGS. 3A and 3B are schematic diagrams showing another scenario in which a user wears a gaze tracking headset to track the user's gaze, according to some embodiments of this disclosure.

As shown in FIGS. 3A and 3B, a scenario is illustrated in which a user wears a gaze tracking headset 330 for tracking the user's gaze. The headset 330 may be the same device as the headset 230 in the embodiment associated with FIGS. 2A and 2B. Therefore, the headset 330 is capable of tracking the eye movement and gaze of the user with high accuracy.

In FIG. 3A, the user is looking at the screen of a first device 310 while not looking at the screen of a second device 320. Since the gaze tracking headset 330 monitors the user's gaze, a first gaze point 311 is determined to be on the screen of the first device 310. As a result, a first notification 312 is displayed by the first device 310 on the screen thereof. It should be noted that in different scenarios, the first notification 312 may have been present by the first device 310 prior to the user's gaze being determined to be on that device. As shown in FIG. 3A, the user has moved his or her gaze into a boundary around the first notification 312, wherein the boundary may be predefined by a specific use such as an administrator or predefined based on the characteristics of first notification 312 according to predefined rules. After the user's gaze has been within the boundary for a predetermined period of time (dwell time), such as a value between 100 milliseconds and 1000 milliseconds, a coordinating device of the system determines that the user has attended to the first notification 312 and then marks or labels the first notification 312 as "viewed". In this example, any of the first device 310, the second device 320, or the gaze tracking headset 330 may be the coordinating device. It should be appreciated that the user may be able to configure the "responsiveness" of the system by adjusting the lower and upper limits of the dwell time.

As shown in FIG. 3B, the user's gaze shifts to the second device 320. The gaze tracking headset 330 is capable of monitoring this change in attention and registering the user's gaze shift to the screen of the second device 320, indicated by a second gaze point 321. However, since the first notification 312 has been labeled as viewed, in response to the user's eye movement, the same notification will not be displayed on the screen of the second device 320.

The scenario shown in FIGS. 3A and 3B provides benefits for managing notifications in a multi-device environment. The user's gaze, tracked by the headset 330, controls the delivery of notifications across devices, creating an intelligent and responsive communication system. Once a notification is acknowledged on one device (as indicated by the user's gaze dwelling within the boundary defined by a notification for a predetermined period of time), it is marked as "viewed," preventing its redundant display on subsequent devices. By managing notifications based on their labels, the notification may be able to follow the user's gaze, ensuring that the user can always receive the notification, and even take advantage of a lightweight mechanism to intentionally dismiss notifications (by looking at them and moving attention away). This strategy also effectively addresses "notification fatigue" and reduces unnecessary distractions for the user. As a result, this system optimizes user attention management across devices, resulting in a more efficient, personalized, and less intrusive digital experience.

In above embodiments, the second device 320 is described, as an example, to take a specific action (that is, not to display the same notification) once the notification has been displayed by the first device 310 and has been viewed by the user. In some other embodiments, the second device 320 may take other suitable actions with respect to a notification once the notification has been displayed by the first device 310 and has been viewed by the user. For example, once a notification displayed by the first device 310 has been viewed by the user, the second device 320 may display the notification in a less noticeable manner (such as a faded or low contrast manner).

As shown in FIGS. 4A and 4B, a scenario is illustrated in which a user wears a gaze tracking headset 430 for tracking the user's gaze. The headset 430 may be the same device as the headset 230 in the embodiment associated with FIGS. 2A and 2B. Therefore, the headset 430 is capable of tracking the eye movement and gaze of the user with high accuracy.

In FIG. 4A, the user is looking at a first device 410 while not looking at the screen of a second device 420. Because the gaze tracking headset 430 monitors the user's gaze, a first gaze point 411 is determined to be on the first device 410. In this scenario, the first device 410 does not have a high resolution display or screen capable of displaying the notification. For example, the first device 410 may be an IoT speaker. Although it does not have a high-resolution screen for fine display, it may have an LED indicator that indicates that a new notification has been received. For example, a first notification 412 is displayed to the first device 410 in the form of a blinking or a particular color so that the user may notice that a new notification has been received. Alternatively or additionally, the first notification 412 may be an audible alert present by the first device 410. It should be noted that in various scenarios, the first notification 412 may have been present by the first device 410 prior to the user's gaze being determined to be on that device. Because the first device 410 is not capable of displaying the notification at a high resolution, the first notification 412 is not labeled as "viewed".

As shown in FIG. 4B, the user's gaze shifts to the second device 420 having a high-resolution screen. The gaze tracking headset 430 is capable of monitoring this change in attention and registering the user's gaze shift to the screen of the second device 420, indicated by a second gaze point 421. This capability allows the system to understand that the user has not viewed/attended to the first notification 412 on the first device 410. After the user's gaze has been on the second device 420 or the screen of the second device 420 for a predetermined period of time (dwell time), such as a value between 0 millisecond (instant) and 100 milliseconds, a coordinating device of the system determines that the user has attended to the second device 420 and any unviewed notifications may be displayed on the second device 420. Therefore, in response to the user's eye movement, the first notification 412 is displayed as a second notification 422 on the screen of the second device 420. In this example, any of the first device 410, the second device 420, or the gaze tracking headset 430 may be the coordinating device. It should be appreciated that the user may be able to configure the "responsiveness" of the system by adjusting the lower and upper limits of the dwell time.

The scenario depicted in FIGS. 4A and 4B illustrates additional benefits for users within a diverse digital ecosystem. It safeguards selected notifications from being overlooked, even if they are initially received on a device with limited display capabilities, such as an IoT speaker. It improves the user experience by intuitively moving notifications to a device the user is actively looking at. For example, when the user's attention shifts to a device with a high-resolution display, the system responds intelligently by displaying the notification on that device for detailed viewing. This dynamic system, which responds to both the user's gaze and device constraints, ensures that important notifications are effectively communicated while providing a streamlined, non-disruptive user experience.

In the scenarios shown in FIGS. 2A through 4B, different devices function as components of a unified digital ecosystem. This ecosystem may be established within a local network environment or span the Internet, enabling effective inter-device communication. Depending on the specific requirements and contexts, devices may use communication protocols such as Wi-Fi™, Bluetooth™, or cellular data to facilitate real-time information sharing and synchronization. This interactive setup results in a seamless user experience as devices work together in a cohesive manner.

Notification management across the ecosystem may be achieved through the use of a central data repository or cloud storage system that serves as a place where notifications are stored and maintained. The repository may reside on one of the devices, such as a computer or smartphone, or it may reside externally in a cloud-based repository accessible by all devices in the ecosystem. The stored notifications may carry relevant metadata such as their source, content, time of arrival, and "viewed" status. The decision to display a notification on a particular device may be based on a combined assessment of factors such as the user's gaze, device capabilities, and device activity, as illustrated by the various scenarios in FIGS. 2A through 4B. The gaze tracking headset provides real-time data about the user's gaze direction, indicating the device the user is currently focusing on. In conjunction with the device's display capabilities, the system may make an informed decision about where to display a notification, ensuring effective and dynamic notification management.

Although the above scenarios are based on the situation where multiple electronic devices are involved, there may be only one electronic device involved in the system. For example, the user may not be looking at the single electronic device when the notification is received and the gaze tracking device detects that the user is not looking at the electronic device. In this case, for example, a notification may be presented to the user by a vibrating or audible alert generated by the gaze tracking headset, and the user may then look at the only electronic device, after which the notification is displayed thereon. When the system determines that the user has read the notification on the electronic device, the notification is marked as viewed.

Although the gaze tracking device shown in FIGS. 2A through 4B is a wearable headset, it should be understood that other devices may also be used. In another scenario, the gaze tracking may be performed by a stationary device that is not worn by the user but is strategically placed in the environment, such as on a table or attached to an electronic device such as a television. This stationary gaze tracker, equipped with cameras and infrared sensors, captures detailed images and depth information about the user and the environment.

The operation of the gaze tracker may begin with facial recognition, which identifies key features such as the eyes and nose to locate the user's face in its field of view. The infrared sensors may project harmless, invisible light onto the user's face, which is reflected back into the device, providing the necessary data to determine the position and movement of the user's pupils. By determining the orientation of the user's eyes relative to 3D space, the gaze tracker is able to infer the direction of the user's gaze in real time.

Determining a user's focus on a specific device in this scenario requires the system to detect and spatially map all potential devices in the user's environment. Once the devices are mapped, the system may compare the determined gaze direction with the locations of the devices. If the gaze direction intersects with the location of a device within the 3D map, the system may infer that the user is looking at that particular device. As a result, notifications and relevant information may be intelligently displayed based on the user's direction of gaze, enhancing the overall user experience in this interactive multi-device ecosystem.

In an alternative scenario, the user may engage with a VR/AR headset that incorporates gaze tracking technology to enrich the user's interaction within a digitally rendered virtual space. This VR/AR headset, similar to previous embodiments, has the ability to track the direction and focus of the user's gaze in real time, but uniquely applies this within a virtual environment. As the user is immersed in the virtual space, the VR/AR headset actively determines the direction of gaze and maps it to the coordinates of the virtual space. Notifications in this environment are not limited to physical devices, but are designed as elements within the virtual world itself. Depending on the VR/AR application, notifications may take different forms, such as pop-ups, banners, or even interactive objects.

It should be understood that, in the context, VR devices refer to electronic devices or systems capable of immersing the user in a computer-generated environment in which the user's perspective is determined by the position and movement of the user's head. AR devices, on the other hand, superimpose computer-generated information on the user's view of the real world to enhance the user's perception of reality. Some devices, such as the Apple Vision Pro™, may include AR functionality through VR pass-through technology. This feature allows users to see a real-time video feed of the actual environment around them while wearing the VR headset, with virtual objects or information overlaid on top of it. Such devices that seamlessly blend real and virtual elements are considered within the scope of the present disclosure and may be used for the gaze tracking and notification management methods described herein.

Notifications are managed within the virtual space based on the direction of the user's gaze. For example, when a notification occurs, it may be rendered in the periphery of the user's current line of sight or in a particular virtual position. If the user shifts their gaze to the notification, it may animate, expand, or provide additional information to acknowledge the user's attention. If the user's gaze remains on the notification for a certain amount of time (dwell time), such as a value between 100 milliseconds and 1000 milliseconds, the system marks it as "viewed". In addition, the virtual environment may manage and organize notifications in innovative ways. For example, once a notification has been viewed, it may dissolve or move to a "viewed notifications" area within the virtual space. The spatial organization of notifications based on the user's gaze direction enhances the overall VR/AR experience and makes interaction more natural and intuitive. It should be appreciated that the user may be able to configure the "responsiveness" of the system by adjusting the lower and upper limits of the dwell time.

Figure 5:
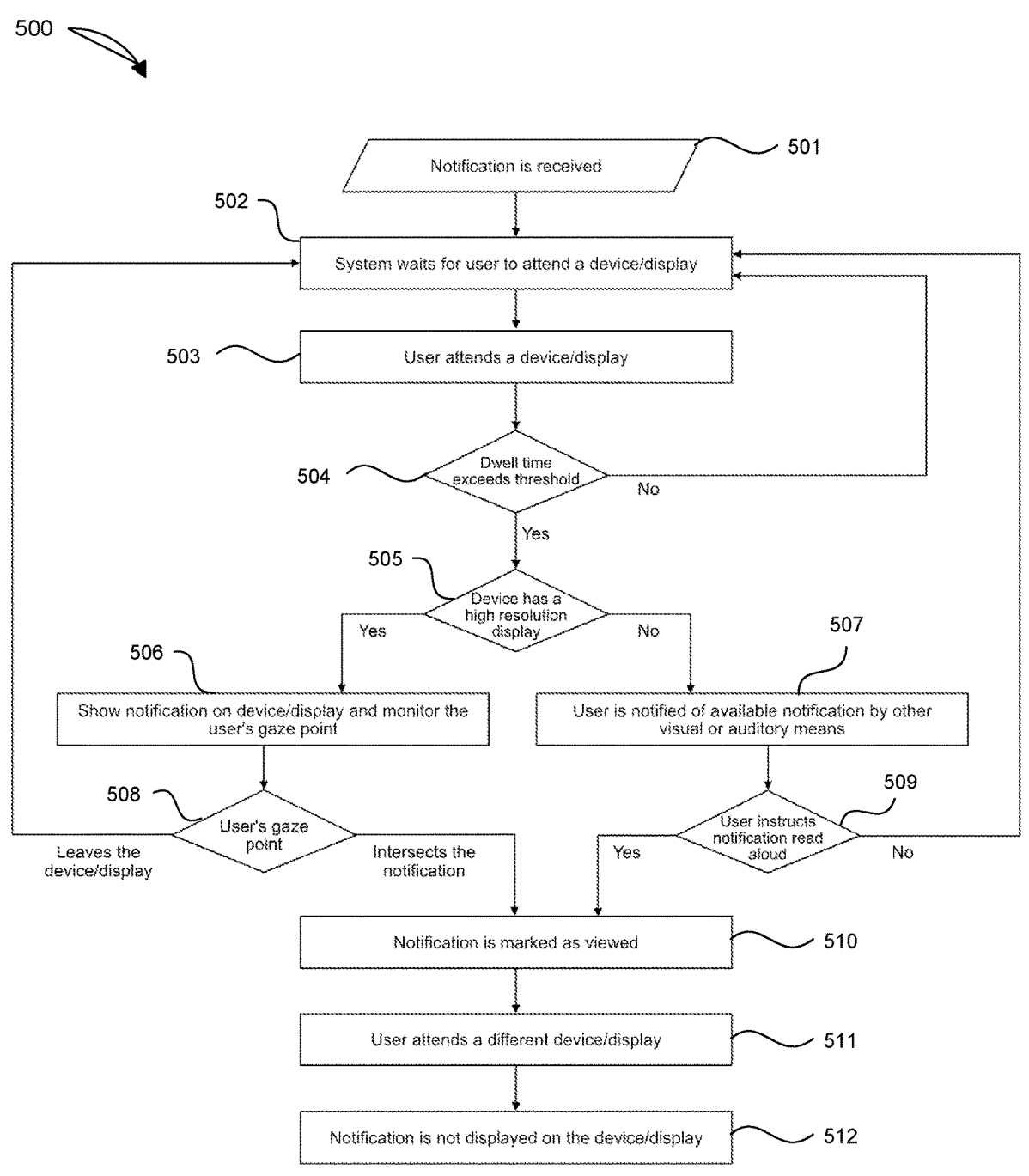
FIG. 5 is a flowchart detailing the process of notification management within a multi-device ecosystem enabled with gaze tracking technology, according to some embodiments of this disclosure.

FIG. 5 represents a flowchart detailing the process of notification management within a multi-device ecosystem enabled with gaze tracking technology. All devices within this ecosystem, referred to as "the system", are interconnected to facilitate information sharing, including the delivery of gaze tracking data from the gaze tracking device to all constituent devices.

At the beginning (step 501), the system receives a notification, which may be either internal or external. This notification may then be stored and marked as "not viewed". The system then waits (step 502) for two conditions to be met: user attention to a device/display and the existence of at least one unviewed notification in the store. This waiting period may optionally be accompanied by auditory or haptic alerts to the user.

Once the user attends to a device (as determined in step 503 by the gaze tracking device), and there is a "not viewed" notification, the system moves to the next phase. It waits for the user's gaze to dwell on the device/display for a time exceeding a predetermined threshold (dwell time) (step 504), such as a value between 0 milliseconds and 100 milliseconds. Upon meeting this threshold, the system determines (step 505) the feasibility of directly displaying the notification on the device in question. Otherwise, the process loops back to step 502 to wait for the two conditions to be met. It should be appreciated that the user may be able to configure the "responsiveness" of the system by adjusting the lower and upper limits of the dwell time.

If the notification is displayed on the device (step 506), the system then tracks the user's gaze on that device (step 508). If the gaze direction leaves the display without intersecting the notification area, the process loops back to step 502. However, if the user's gaze intersects the notification area for a predetermined threshold (dwell time), such as a value between 100 and 1000 miliseconds, the notification is marked as "viewed" (step 510). It should be appreciated that the user may be able to configure the "responsiveness" of the system by adjusting the lower and upper limits of the dwell time.

On the other hand, if the device is unable to display the notification due to resolution limitations or other reasons (determined in step 505), an alternative notification method is used (step 507), which may be auditory or visual. The user may then prompt the device to read the notification aloud (step 509). Once read, the notification is marked as "viewed" and the process proceeds to step 510, or otherwise the system returns to step 502.

In the final stages, after the notification has been marked as "viewed" (step 510), the system detects when the user shifts attention to a new device or display (step 511). Based on the "viewed" status, the system ensures that the same notification is not displayed again on the new device or display (step 512). This effectively prevents unnecessary repetition of notifications across devices.

In some embodiments, the system of interconnected devices may have a selected "primary device" that serves as the core of the ecosystem. This primary device may be any device within the network of available devices, selected based on its capabilities or user preference. This device plays the central role in coordinating gaze information, receiving and storing notifications, and managing the delivery of these notifications to secondary devices within the ecosystem.

In some embodiments, the system extends the initial setup to an ecosystem of devices owned by multiple users. These devices may be categorized as either private (such as personal smartphones) or shared (such as a television). The system makes an additional determination to determine whether the device the user is currently interacting with is theirs, i.e., whether it's their personal device or a shared device. In this scenario, a privacy mode may be optionally introduced to only display notifications on shared devices when the intended user is the only one attending to it.

In some embodiments, the system may include an additional and optional step of storing the last displayed notification for a specified period of time. If the user's gaze returns to the area previously occupied by the notification within a specified time and margin, such as a value between 500 milliseconds and 2500 milliseconds, the same notification is displayed again. It should be appreciated that the user may be able to configure the specified time and margin by adjusting the lower and upper limits.

In some embodiments, the gaze tracking device may be a head-mounted gaze tracker applicable to both single-user and multi-user systems. Each user in a multi-user ecosystem may wear their own gaze tracker, allowing for personalized gaze tracking. Alternatively, as described above, gaze tracking may be facilitated by one or more stationary gaze trackers working in coordination. These stationary trackers may be part of a single-user or multi-user system and provide efficient gaze tracking without the need to be worn by the user.

In some embodiments, the gaze tracking device may be external to the system of interconnected devices. This allows for flexibility in the placement and use of the gaze tracking technology, opening up possibilities for different configurations and use cases.

In some embodiments, each device within the ecosystem running HarmonyOS™ may independently provide gaze tracking. This allows for individual tracking from each device, thereby increasing the overall effectiveness and accuracy of the system.

In some embodiments, the gaze tracking devices may be a combination of internal, external, and device-integrated units. This combination approach allows for more complex and robust tracking capabilities by leveraging the strengths of different types of tracking devices.

In some embodiments, the entire system and all component devices may be placed within a VR or AR environment. The user interacts within this virtual environment and the VR or AR headset acts as a gaze tracking device. Optionally, the limitation on the location of notifications within the device area may be removed. Notifications may be displayed in a specified area around the device where gaze tracking is functional. This new area is referred to as the device area. Optionally, a virtual device that doesn't contain a screen and operates visually or auditorily may create a temporary virtual display. This allows it to operate as a traditional display device, increasing the versatility of the system in the VR or AR environment.

FIG. 6 illustrates a method 600 for managing notifications based on gaze tracking, which interacts with a user's gaze in real time, understands their attention, and responds appropriately. At step 601, the user's POG, a parameter that indicates the user's current focus, is acquired from a gaze tracking device. This device monitors and records the user's eye movement and direction in real-time, as described with respect to previous embodiments.

At step 602, the spatial position of a notification that is displayed on the first screen of a first electronic device within the user's environment is acquired. The spatial position refers to the location of the notification on the screen. The positional information may be acquired by a camera on the gaze tracking device or by a standalone camera, as described with respect to previous embodiments.

Thereafter, at step 603, it is determined whether the user's POG remains within a predefined boundary associated with the spatial location of the notification. If the user's POG remains within this boundary for a predetermined period of time, it's assumed that the user has seen or read the notification. Once the user's attention to the notification is confirmed, a first signal is sent to the first electronic device. This signal carries the information that the user has viewed the notification. In response to this first signal, the notification is marked as "viewed" at step 604.

The above steps 601 to 604 outline an effective method for tracking and managing notifications based on a user's gaze behavior and provide the general framework and fundamental operations that are required for the embodiments described herein, as they all involve some form of gaze tracking, notification display, and notification management.

In some embodiments, an additional mechanism may be included wherein a second signal is sent to the first electronic device if the user's POG remains on the first screen for a first predetermined amount of time and the notification has not been marked as viewed. This indicates to the device that the user is looking at the first screen and prompts the first electronic device to display the notification. This allows notifications to be displayed in real time and only when the user's gaze is directed to the device, thereby minimizing distraction and conserving display space.

In some embodiments, after the first electronic device receives the first signal indicating that the user has viewed the notification, the notification is then removed from the first screen. This automatic clearing of viewed notifications keeps the user interface clean and free of unnecessary clutter.

In some embodiments, a third signal may be sent to a second electronic device if the user's POG remains on the screen of that second electronic device (second screen) for a period of time and the notification hasn't been marked as viewed. This signals to the second electronic device that the user's gaze is on its screen and prompts it to display the notification. This seamless transition between devices ensures that the user never misses a notification, no matter which device they are using.

In some embodiments, the first signal indicating that the notification has been viewed may be sent to both the first and second electronic devices if the user's POG remains within a certain boundary defined by the notification on the second screen for a certain period of time. This ensures that all devices update their notification status synchronously, providing a consistent user experience across all devices.

In some embodiments, after the second device receives the first signal that the user has viewed the notification, the notification is removed from the second screen. This helps to keep the user interface on the second device as clean and uncluttered as possible.

In some embodiments, a fourth signal may be sent to a third electronic device if the user's POG remains on that third electronic device for a second predetermined time and the notification has not been marked as viewed. This signal informs the third electronic device that the user's attention is directed to it, causing that device to alert the user to the notification by a visual or audible cue, particularly if the third electronic device does not have a high resolution screen to ideally display the notification, but is able to alert the user by other means.

In some embodiments, the first signal indicating that the user has viewed the notification may be sent to the first and third electronic devices in response to the user giving a voice command acknowledging the notification. This allows for hands-free operation and is particularly useful in situations where the user may be engaged in other tasks.

In some embodiments, the gaze tracking may be achieved through a device that the user is able to wear, such as a pair of smart glasses or a headset. This wearable device would include a forward-facing camera that captures the user's field of view. The spatial position of the notification in physical space may then be inferred from the captured field of view, providing real-time tracking of where the user is looking. This provides a very intuitive and immersive user experience.

Figure 7:
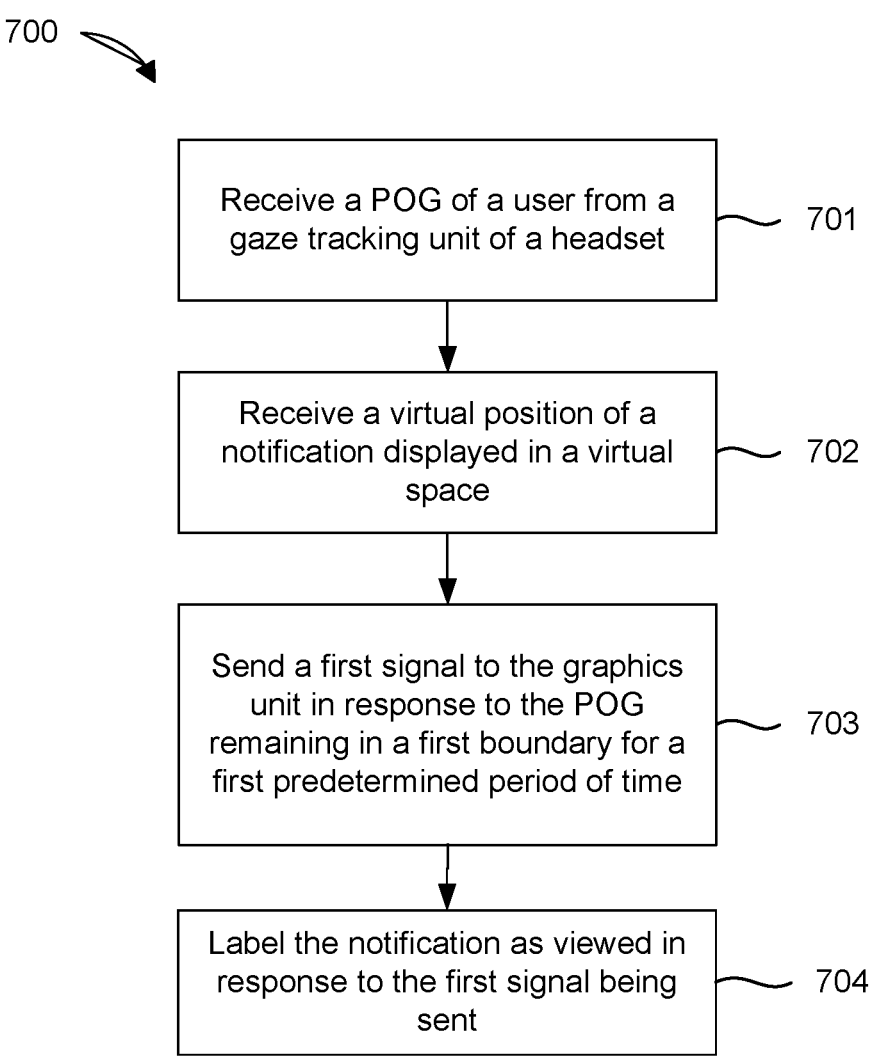
FIG. 7 is a flowchart directed to a method for managing notifications based on gaze tracking in a virtual space, according to some embodiments of this disclosure.

FIG. 7 illustrates a method 700 for managing notifications based on gaze tracking on a headset that renders a 3D representation of a virtual space. The headset is equipped with a gaze tracking unit that continuously observes and records the direction of the user's gaze and determines where exactly in the user's field of view the user is looking. This gaze tracking is accomplished by monitoring the user's eye movements in real time. The headset also contains a graphics unit capable of creating a 3D representation of the virtual space. The user wearing the headset is able to see this virtual space. Within this virtual space, notifications may be displayed at specific virtual locations.

At step 701, the user's POG is acquired by the gaze tracking unit, and at step 702, the virtual position of a notification displayed within this virtual space is acquired. If the POG of the user remains within a certain boundary defined by the virtual position of the notification for a first predetermined period of time, this is taken as an indication that the user has looked at the notification. Consequently, at step 703, a first signal is sent to the graphics unit, and then, at step 704, the notification is labeled as "viewed".

In essence, this method 700 encapsulates an interaction between the user and the notifications within a virtual environment. The system tracks the user's gaze and uses this information to determine whether or not the user has viewed a notification, based on whether the user has looked at the notification for a certain amount of time. This setup ensures that the user's engagement with the virtual environment is accurately reflected in the status of the notifications displayed within it.

In some embodiments, a second boundary may be considered around the virtual position of the notification (the second boundary is larger than the first boundary). If the user's POG remains within this larger boundary for a period of time and the notification hasn't been marked as viewed, a second signal is sent to the graphics unit. This second signal instructs the graphics unit to render the notification at the virtual position, thereby increasing the likelihood that the user will notice the notification.

In some embodiments, the system may provide a more immersive alert system for notifying the user. If the user's gaze remains within the larger second boundary for a period of time and the notification hasn't been labeled as viewed, a visual alert is rendered in virtual space or an audible alert is played through the headset's audio unit. This dual sensory approach maximizes the likelihood that the user will acknowledge the notification.

In some embodiments, the system may utilize a microphone unit within the headset. The microphone is tuned to receive a vocal command from the user acknowledging that they've seen the notification. Upon receiving this command, a signal is sent to both the graphics and audio units. This allows the system to mark the notification as viewed based on the user's vocal confirmation, providing an additional layer of interactivity.

In some embodiments, the system may include an automatic notification release mechanism. Once the user has viewed the notification, the graphics unit receives a signal instructing it to remove the notification from its virtual position. This ensures that the virtual space remains uncluttered, contributing to a more streamlined and focused user experience in the virtual environment.

With the various embodiments described herein, the system demonstrates a level of interactivity and efficiency that is unprecedently convenient. The present disclosure introduces the groundbreaking concept of moving notifications to the device under the user's attention, leveraging the capabilities of a gaze tracker. Unlike current systems that spread notifications across all devices, our system prioritizes user engagement and optimizes notification delivery.

This intelligent system ensures that if a user does not notice a notification, it will follow them across devices until they do. Once noticed, it conveniently disengages, maintaining a clean, uncluttered inbox across devices. This dynamic mechanism fundamentally changes the notification experience and promotes faster, more efficient user interaction. In addition, the benefits of this system go beyond efficiency. It also results in significant energy savings by not displaying notifications on unattended devices. This targeted delivery approach not only conserves resources, but also improves the overall environmental performance of the system.

It also ensures that users do not miss notifications. By tracking the user's gaze and adjusting notification delivery accordingly, it significantly reduces the likelihood of missing important alerts. The lightweight mechanism also allows the user to dismiss notifications by simply looking at them. This interaction feels intuitive and smooth, making the system an ideal choice for users seeking a streamlined experience. The system also promotes seamless interactions between devices. By coordinating notifications based on the user's attention, it promotes a fluid exchange of information between devices, contributing to a connected and harmonious device ecosystem.

The embodiments of the invention described herein are intended to be exemplary and illustrative, not limiting. Variations, modifications, and alternative implementations may occur to those skilled in the art without departing from the spirit and scope of the invention as claimed.

The described embodiments may be implemented in software, hardware, firmware, or any combination thereof, within a variety of systems or applications. Additionally, any of the described units, operations, or methods may be embodied as code executed on a programmable processor. Further, it should be understood that any reference to an element herein using a designation such as "first," "second," and so forth does not generally limit the quantity or order of those elements.

References made in the specification to "one embodiment," "an embodiment," "an example embodiment," etc., indicate that the embodiment described may include a particular feature, structure, or characteristic, but not every embodiment necessarily includes the particular feature, structure, or characteristic. Moreover, such phrases are not necessarily referring to the same embodiment. When a particular feature, structure, or characteristic is described in connection with an embodiment, it is understood that it is within the knowledge of one skilled in the art to effect such feature, structure, or characteristic in connection with other embodiments whether or not explicitly described.

In the drawings and specification, there have been disclosed typical preferred embodiments of the invention and, although specific terms are employed, they are used in a generic and descriptive sense only and not for purposes of limitation, the scope of the invention being set forth in the following claims. Therefore, it is to be understood that the foregoing is illustrative of the present invention and should not be construed as limited to the specific embodiments disclosed. The invention is defined by the following claims, with equivalents of the claims to be included therein.

What is claimed is:

1. A method of notification management, comprising:
receiving a point of gaze (POG) of a user from a gaze tracking device, the POG representing a direction of an eye of the user;
displaying a notification on a first screen of a first electronic device, the notification informing the user of new information or updates;
receiving a spatial position of the notification displayed on the first screen of the first electronic device in a space;
in response to the POG of the user remaining within a first boundary around the spatial position of the notification for a first predetermined period of time, sending a first signal to the first electronic device;

in response to sending the first signal to the first electronic device, removing the notification from the first screen of the first electronic device and labelling the notification as viewed;
determining the POG of the user remains on a second screen of a second electronic device for a second predetermined period of time;
in response to the POG of the user remaining on the second screen of the second electronic device for the second predetermined period of time and the notification not being labeled as viewed:
sending a second signal to the second electronic device, the second signal indicating that the user is looking at the second screen; and
in response to sending the second signal to the second electronic device, displaying the notification on the second screen of the second electronic device; and
in response to the POG of the user remaining on the second screen for the second predetermined period of time and the notification being labeled as viewed:
maintaining the notification as labeled viewed without redisplaying the notification on the second screen of the second electronic device.

2. The method of claim 1, further comprising sending the first signal to the first electronic device and the second electronic device in response to the POG of the user remaining within a second boundary defined by the spatial position of the notification displayed on the second screen for the first predetermined period of time.

3. The method of claim 2, further comprising removing the notification from the second screen in response to the second electronic device receiving the first signal.

4. The method of claim 1, further comprising sending a third signal to a third electronic device in response to the POG of the user remaining on the third electronic device for the second predetermined period of time and the notification not being labeled as viewed, the third signal indicating that the user is looking at the third electronic device, wherein the third electronic device notifies the user of the notification by a visual or audible alert in response to the third electronic device receiving the third signal.

5. The method of claim 4, further comprising sending the first signal to the first electronic device and the third electronic device in response to the user giving a vocal command that the user has viewed the notification.

6. The method of claim 1, wherein the gaze tracking device is wearable by the user, and wherein the gaze tracking device comprises a front viewing camera for capturing a field of view of the user, the spatial position of the notification in the space being obtained from the captured field of view.

7. The method of claim 1, further comprising determining a resolution of the first screen, wherein sending the first signal depends on the resolution of the first screen exceeding a predetermined resolution value.

8. A method of notification management, comprising:
receiving a point of gaze (POG) of a user from a gaze tracking unit of a headset, the POG representing a direction of an eye of the user;
displaying a notification on the headset in a virtual space, the notification informing the user of new information or updates, wherein the headset comprises a graphics unit for rendering three-dimensional (3D) representation of the virtual space that is viewable by the user wearing the headset;
receiving a virtual position of the notification in the virtual space;

in response to the POG of the user remaining within a first boundary around the virtual position of the notification for a first predetermined period of time, sending a first signal to the graphics unit, wherein the first signal is used to label the notification as viewed;

in response to sending the first signal to the graphics unit, removing the notification from the virtual space and labelling the notification as viewed;

determining the POG of the user remains on a second boundary encompassing the first boundary for a second predetermined period of time;

in response to the POG of the user remaining on the second boundary encompassing the first boundary for the second predetermined period of time and the notification not being labeled as viewed, sending a second signal to the graphics unit; and in response to the graphics unit receiving the second signal, expanding a size of the notification at the virtual position.

9. The method of claim 8, further comprising sending a second signal to the graphics unit in response to the POG of the user remaining on a second boundary encompassing the first boundary for a second predetermined period of time and the notification not being labeled as viewed, wherein the graphics unit renders a visual alert in the virtual space or an audio unit of the headset plays an audible alert to notify the user of the notification in response to the graphics unit receiving the second signal.

10. The method of claim 9, further comprising sending the first signal to the graphics unit and the audio unit in response to a microphone unit of the headset receiving a vocal command from the user.

11. A device for notification management, comprising:
one or more circuits for:
receiving a point of gaze (POG) of a user from a gaze tracking device, the POG representing a direction of an eye of the user;
instructing a first electronic device to display a notification on a first screen of the first electronic device, the notification informing the user of new information or updates;
receiving a spatial position related to the notification displayed on the first screen of the first electronic device in a space;
determining if the POG of the user remains within a first boundary around the spatial position of the notification for a first predetermined period of time;
in response to the determination being positive, sending a first signal to the first electronic device;
in response to the first electronic device receiving the first signal:
instructing the first electronic device to remove the notification from the first screen of the first electronic device; and
labelling the notification as viewed;
determining the POG of the user remains on a second screen of a second electronic device for a second predetermined period of time;
in response to the POG of the user remaining on the second screen of the second electronic device for the second predetermined period of time and the notification not being labeled as viewed:
sending a second signal to the second electronic device, the second signal indicating that the user is looking at the second screen; and
in response to the second signal being received by the second electronic device, instructing the second electronic device to display the notification on the second screen of the second electronic device; and
in response to the POG of the user remaining on the second screen for the second predetermined period of time and the notification being labeled as viewed:
maintaining the notification as labeled viewed without instructing the second electronic device to redisplay the notification on the second screen of the second electronic device.

12. The device of claim 11, wherein the one or more circuits of the device send the first signal to the first electronic device and the second electronic device in response to the POG of the user remaining within a second boundary defined by the spatial position of the notification displayed on the second screen for the first predetermined period of time.

13. The device of claim 12, wherein the one or more circuits instructs the second electronic device remove the notification from the second screen in response to the first signal being received by the second electronic device.

14. The device of claim 11, wherein the one or more circuits of the device sends a third signal to the third electronic device in response to the POG of the user remaining on a third electronic device for the second predetermined period of time and the notification not being labeled as viewed, the third signal indicating that the user is looking at the third electronic device, and wherein the notification is communicated to the user by a visual or audible alert in response to the third signal being received by the third electronic device.

15. The device of claim 14, wherein the one or more circuits of the device send the first signal to the first electronic device and the third electronic device in response to the user giving a vocal command that the user has viewed the notification.

16. The device of claim 11, wherein a field of view of the user is captured by a front viewing camera of the gaze tracking device worn by the user, the spatial position of the notification in the space being obtained from the captured field of view.

17. The device of claim 11, wherein the one or more circuits of the device send the first signal when a resolution of the first screen exceeds a predetermined resolution value.

18. A headset comprising:
a graphics unit for rendering three-dimensional (3D) representation of a virtual space that is viewable by a user wearing the headset;
a gaze tracking unit, the gaze tracking unit being capable of determining a point of gaze (POG) of a user, and the POG representing a direction of an eye of the user; and
a coordinating unit for instructing the graphics unit to display a notification on the headset in the virtual space, receiving the POG of the user determined by the gaze tracking unit, and receiving a virtual position of the notification in the virtual space, the notification informing the user of new information or updates,
wherein the coordinating unit sends, in response to the gaze tracking unit determining that the POG of the user has remained within a first boundary around the virtual position of the notification for a first predetermined period of time, a first signal to the graphics unit, and wherein the first signal is used to label the notification as viewed,
wherein the coordinating unit further instructs, in response to sending the first signal to the graphics unit, the graphics unit to remove the notification from the virtual space and label the notification as viewed, wherein the gaze tracking unit determines that the POG of the user remains on a second boundary encompassing the first boundary for a second predetermined period of time;

wherein the coordinating unit sends, in response to the POG of the user remaining on the second boundary encompassing the first boundary for the second predetermined period of time and the notification not being labeled as viewed, a second signal to the graphics unit, and wherein the graphics unit expands, in response to the graphics unit receiving the second signal, a size of the notification at the virtual position.

19. The headset of claim 18, further comprising an audio unit, wherein the coordinating unit sends a second signal to the graphics unit in response to the POG of the user remaining on a second boundary encompassing the first boundary for a second predetermined period of time and the notification not being labeled as viewed, and wherein the graphics unit renders a visual alert in the virtual space or the audio unit plays an audible alert to notify the user of the notification in response to the graphics unit receiving the second signal.

20. The headset of claim 19, further comprising a microphone unit, wherein the coordinating unit sends the first signal to the graphics unit and the audio unit in response to the microphone unit receiving a vocal command from the user.

21. A non-transitory computer-readable storage medium storing instructions, which when executed by a processor of an electronic device, causes the electronic device to perform a method, wherein the method comprises:

receiving a point of gaze (POG) of a user from a gaze tracking device, the POG representing a direction of an eye of the user;

displaying a notification on a first screen of a first electronic device, the notification informing the user of new information or updates;

receiving a spatial position of the notification displayed on the first screen of the first electronic device in a space;

in response to the POG of the user remaining within a first boundary around the spatial position of the notification for a first predetermined period of time:

removing the notification from the first screen of the first electronic device; and labelling the notification as viewed;

determining the POG of the user remains on a second screen of a second electronic device for a second predetermined period of time;

in response to the POG of the user remaining on the second screen for the second predetermined period of time and the notification not being labeled as viewed:

displaying the notification on the second screen of the second electronic device; and in response to the POG of the user remaining on the second screen for the second predetermined period of time and the notification being labeled as viewed:

maintaining the notification as labeled viewed without redisplaying the notification on the second screen of the second electronic device.

22. The non-transitory computer-readable storage medium of claim 21, wherein the method further comprises sending the first signal to the first electronic device and the second electronic device in response to the POG of the user remaining within a second boundary defined by the spatial position of the notification displayed on the second screen for the first predetermined period of time.

23. The non-transitory computer-readable storage medium of claim 22, wherein the method further comprises removing the notification from the second screen in response to the second electronic device receiving the first signal.

24. The non-transitory computer-readable storage medium of claim 21, wherein the method further comprises sending a third signal to a third electronic device in response to the POG of the user remaining on the third electronic device for the second predetermined period of time and the notification not being labeled as viewed, the third signal indicating that the user is looking at the third electronic device, wherein the third electronic device notifies the user of the notification by a visual or audible alert in response to the third electronic device receiving the third signal.

25. The non-transitory computer-readable storage medium of claim 24, wherein the method further comprises sending the first signal to the first electronic device and the third electronic device in response to the user giving a vocal command that the user has viewed the notification.

26. The non-transitory computer-readable storage medium of claim 21, wherein the gaze tracking device is wearable by the user, and wherein the gaze tracking device comprises a front viewing camera for capturing a field of view of the user, the spatial position of the notification in the space being obtained from the captured field of view.

* * * * *